July 22, 1924.
W. S. PETERSON
SHOCK ABSORBER
Filed May 25, 1922
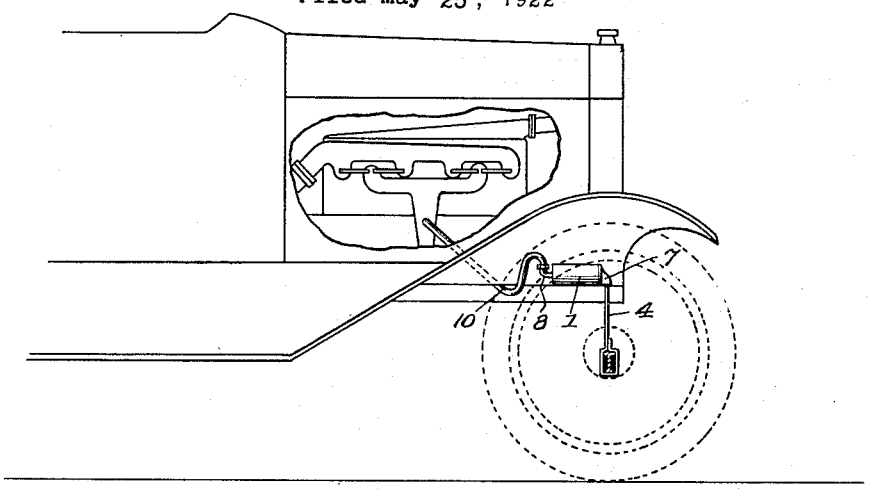
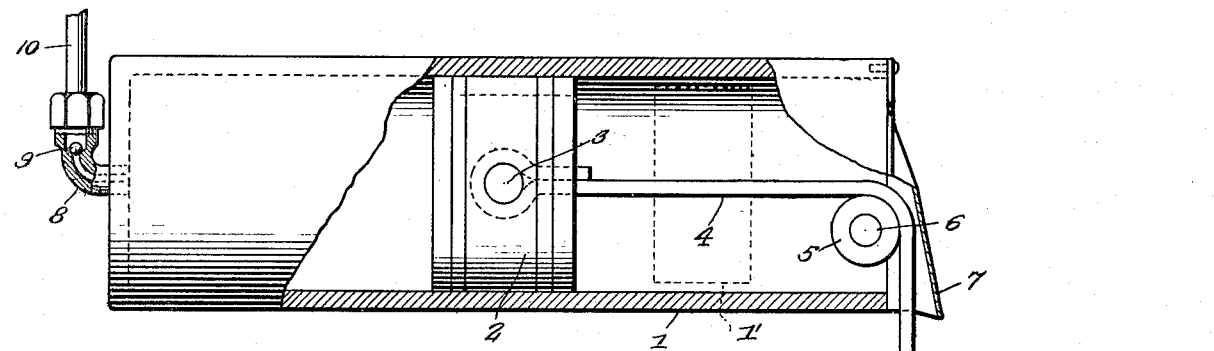
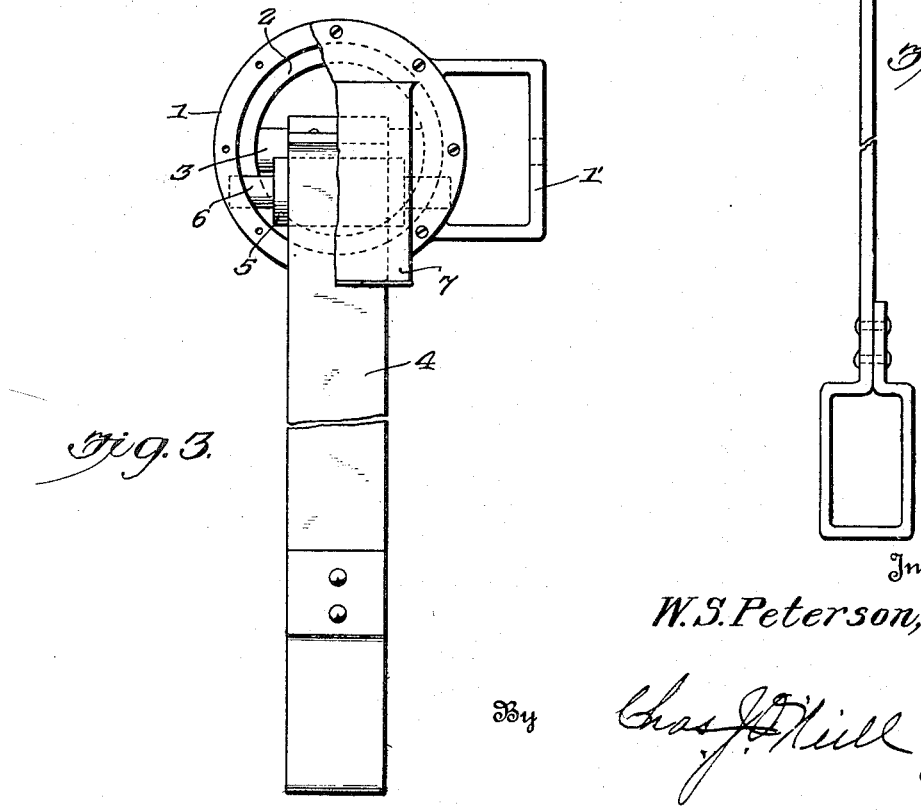
Inventor
W. S. Peterson,
By Chas. J. Hill
Attorney

Patented July 22, 1924.

1,502,209

UNITED STATES PATENT OFFICE.

WALTER S. PETERSON, OF DENVER, COLORADO.

SHOCK ABSORBER.

Application filed May 25, 1922. Serial No. 563,682.

*To all whom it may concern:*

Be it known that I, WALTER S. PETERSON, a citizen of the United States, residing at the city of Denver, county of Denver, State of Colorado, have invented certain new and useful Improvements in Shock Absorbers; and I do hereby declare the following to be a full, clear, and exact description of the invention, such as will enable others skilled in the art to which it appertains to make and use the same.

The invention relates to a shock absorber for automobiles and the like, and has for its object to provide a simple, cheap and efficient device for taking up or absorbing the rebound shock of automobile springs, and at the same time to augment or accentuate the action of the springs in cushioning the stresses which would be ordinarily transmitted from the wheels to the body of the vehicle.

To these ends the invention comprises a cylinder, preferably open at one end and closed at the other, in which is positioned a freely moving piston adapted to be connected with an axle or other part of the running gear of an automobile, preferably by means of a flexible link connected at one end to the piston and running over a guide roller mounted in the open end of the cylinder, with the outer end of the link connected to an axle, the closed end of the cylinder being provided with a pipe connection or conduit leading to an air exhausting means, preferably the intake manifold of the internal combustion engine so that, when the engine is being operated the air is withdrawn from the closed end of the cylinder in front of the piston, the conduit aforesaid having therein a check valve closing toward the cylinder to prevent the breaking of the vacuum established in the latter.

The invention is illustrated in the accompanying drawings, in which,

Fig. 1 is a diagrammatic elevation of the front part of an automobile showing the invention attached thereto;

Fig. 2 is a side elevation, partly in section, of the shock absorber;

Fig. 3 is a front elevation showing the cover plate for the open cylinder end, partly broken away.

Referring to the drawings, 1 indicates a cylinder of metal or other appropriate material, having one end open and the other end closed, preferably by an integral head. Freely movable within the cylinder is a piston 2, which is constructed and arranged to maintain a gas-tight joint between its periphery and the inner walls of the cylinder. The piston is provided with a cross pin 3, to which is attached one end of a coupling or link, the other end of which is adapted to be attached to an appropriate part of the running gear of an automobile. In the form of the apparatus shown, the link takes the form of a flexible strap 4, one end of which is looped about the pin 3, and the other end provided with a loop adapted to be secured to the adjacent axle of the machine, as illustrated in Fig. 1, the intermediate portion of the flexible strap passing over a guide roller 5 journalled on a cross pin 6 fixed in the forward open end of the cylinder 1. Preferably, the open end of the cylinder is protected by a sheet metal hood or cover 7, which prevents the access of dirt or foreign material to the interior of the cylinder.

The closed end of the cylinder has connected thereto a suitable coupling 8 provided with a check valve 9 which opens outwardly, the coupling being attached to a pipe or other suitable conduit 10, which is in turn tapped into the intake manifold of the automobile engine or other operative element of the power plant, which is capable of exhausting the air from the closed end of the cylinder in front of the piston therein. Obviously, instead of connecting the suction pipe 10 from the cylinder to the intake manifold, it may be connected with the proper piping of the vacuum feed system, if the automobile is provided with such a system, or even with the exhaust system, provided the connection with the latter is so made that the movement of the exhaust gases will serve to eject or withdraw the air from the cylinder 1.

In the normal application and operation of the invention, the cylinder 1 is secured to some part of the vehicle body or chassis by means of a suitable side bracket 1', so that the flexible link connection from the piston 2 may be led directly to the axle, spring, or other element of the running gear to which said link is to be attached. Obviously, any desired number of the shock absorbers may be applied, and the exhaust pipes from the same may be connected to a common pipe or conduit, and the latter in turn connected to the intake manifold or other air exhausting means, associated with the power plant. When so applied, the normal operation of the air exhausting means, as, for instance, the suction produced in the intake manifold of the engine, will produce a vacuum in the closed end of the cylinder, so that the tendency of the piston is to move towards the closed end of the cylinder. When the moving automobile strikes a bump, rut, or other irregularity and the springs are compressed so that the body of the vehicle moves downward toward the axles, or vice versa, the axles move up toward the body, the tension on the link or strap 4 is decreased and the piston 2 is forced by atmospheric pressure forward toward the closed end of the cylinder, and into the evacuated space within the cylinder. When the springs react and the rebound takes place, a positive pull is exerted on the link or strap 4, which tends to move the piston in the reverse direction, or away from the closed end of the cylinder, and when the pull on the strap 4 exceeds the pull exerted by the suction of the automobile power plant, the check valve 9 closes. As the piston moves away from the closed end of the cylinder, the vacuum between the piston and said closed end is increased and greatly retards the forward motion of the piston, thereby effectively checking the rebound action of the automobile springs, and practically absorbing and eliminating the shock of the rebound. The constant and normal pull on the springs exerted by the piston 2, when the engine is running, and a vacuum is induced in the closed end of the cylinder, causes the springs to act more quickly when the vehicle encounters any irregularities in the road, so that a vehicle equipped with the shock absorbers rides more smoothly, because of the fact that the springs are more responsive, and the shocks and stresses of all reactions or rebounds of the spring, which would normally be transmitted to the vehicle body, are completely eliminated by the absorber, as described.

What I claim is:

1. A shock absorbing device for automobiles comprising a cylinder closed at one end and open to the atmosphere at the other, a piston therein, means extending out of the open end for connecting the piston to the running gear, and means including an outwardly opening check valve for connecting the closed end of the cylinder with an air exhausting means associated with the power plant of the vehicle.

2. A shock absorbing device for automobiles comprising a cylinder closed at one end, a piston therein, a flexible link connecting the piston to the running gear, and means including an outwardly opening check valve for connecting the closed end of the cylinder with an air exhausting means associated with the power plant of the vehicle.

3. A shock absorbing device for automobiles comprising a cylinder closed at one end, a piston therein, a flexible link for connecting the piston to the running gear, a guide roller in the fore part of the cylinder for said flexible link, and means including an outwardly opening check valve for connecting the closed end of the cylinder with an air exhausting means associated with the power plant of the vehicle.

4. A shock absorber for automobiles comprising a cylinder closed at one end and open to the atmosphere at the other, a piston freely movable in the cylinder, means extending out of the open end for connecting the piston with the running gear of the vehicle, and a conduit including an outwardly opening check valve connecting the closed end of the cylinder with an air exhausting means associated with the power plant of the automobile.

In testimony whereof I affix my signature.

WALTER S. PETERSON.